UNITED STATES PATENT OFFICE.

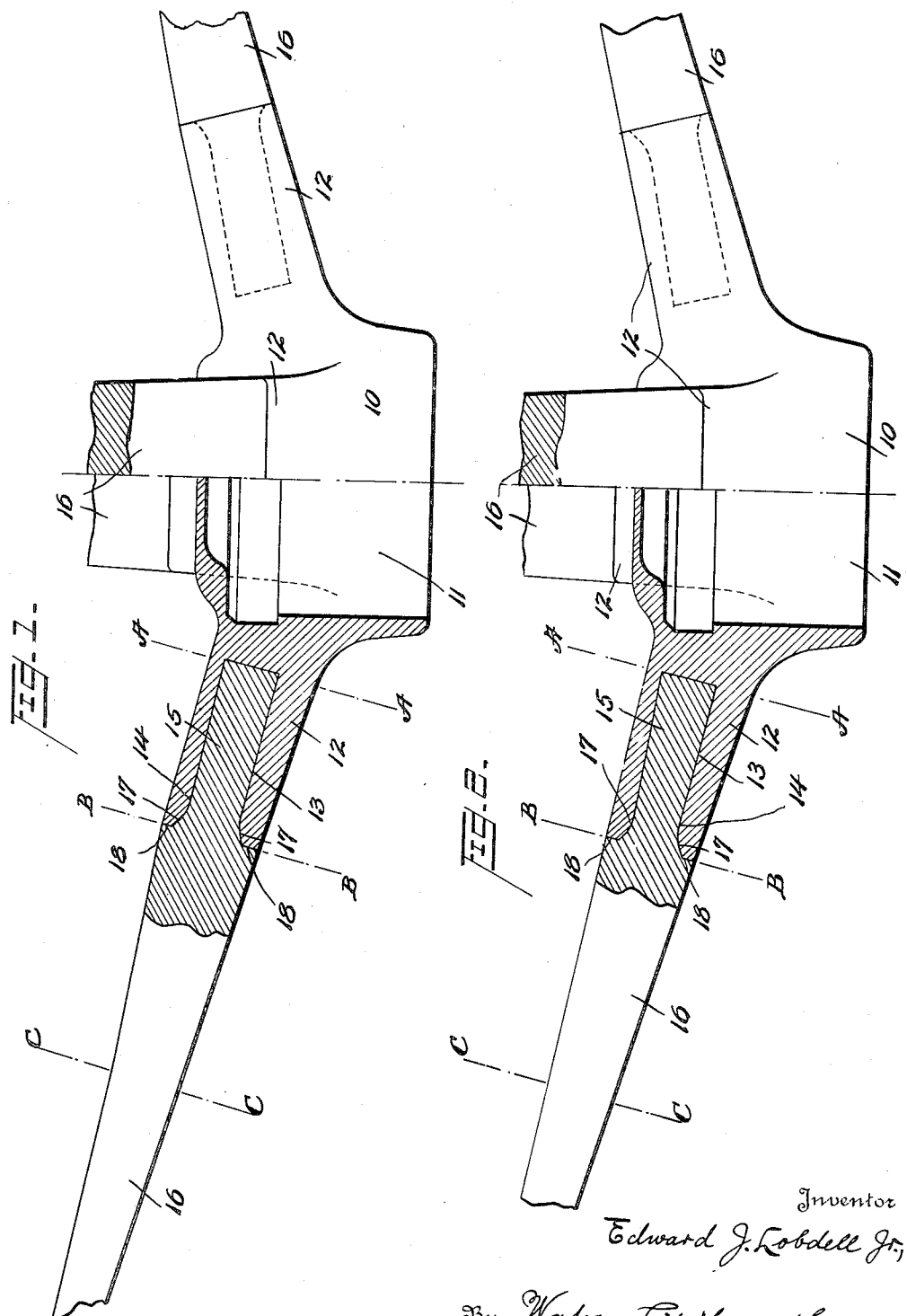

EDWARD J. LOBDELL, JR., OF ONAWAY, MICHIGAN, ASSIGNOR TO THE AMERICAN WOOD RIM COMPANY, OF ONAWAY, MICHIGAN, A CORPORATION OF WEST VIRGINIA.

STEERING-WHEEL CONSTRUCTION.

1,427,487.     Specification of Letters Patent.     Patented Aug. 29, 1922.

Application filed January 20, 1922. Serial No. 530,677.

*To all whom it may concern:*

Be it known that I, EDWARD J. LOBDELL, Jr., a citizen of the United States, and residing at Onaway, Presque Isle County, State of Michigan, have invented certain new and useful Improvements in Steering-Wheel Construction, of which the following is a specification.

This invention relates to steering wheels and consists in a novel structural combination of wooden spokes and a metal hub and a novel method for producing it. The steering wheel embodying the invention has the advantages of great simplicity in construction including only a minimum of parts of simple, easily produced form, great strength and rigidity in connections of the parts preventing the development of looseness in use and a very attractive appearance. One of the most important features of the invention is that the inner ends of the spokes in the hub sockets are compressed by the contraction of the metal of the socket and that compression or reduction in cross sectional size is greatest at the outer end of the socket whereby the spokes are not only held with great rigidity, but it is impossible to pull a spoke longitudinally out of the socket. The material of the spoke is furthermore compressed beyond the outer end of the socket making a close fiber and tending to avoid breaking the fiber in compressing the socket around the spoke. The novel features will be apparent from the following description and claims taken with the accompanying drawings:

In the drawings:

Fig. 1 is a partial vertical section through the metal hub and showing a part of the wooden spokes in place before the spokes are clamped and compressed in the socket; and Fig. 2 is a similar view showing the spokes compressed and clamped in finished position.

As shown in the drawings, a hub 10 of malleable metal has a central bore 11 by which it is adapted to be secured to the steering post, for instance, of an automobile and radiating extensions 12 forming sockets 13. These extensions and their enclosed sockets are preferably rectangular in cross section as shown and are of considerably greater width than thickness, as is usual in steering wheels for automobiles. From a transverse plane at the point 14 to the bottom of the socket 13 the socket has a uniform cross section whereby the reduced rectangular end portion 15 of the wooden spoke 16 may be driven into it tightly from the outer open end of the socket. From a transverse plane at 14 to the end of the socket on the line B—B the inner end edges of the upper and lower walls of the socket are formed on a curve indicated at 17 which merges into the end wall of the socket on line B—B between the outer surface and the lines of the socket. This leaves straight transverse plane surfaces at the ends of the socket abutting shoulders 18 on the spoke 16 the intermediate portion between the shoulders 18 and the end portion 15 being on a curve fitting the curved portion 17. As will be seen by reference to Figure 1, when the wooden spoke which tapers from the line B outward has its inner end 15 forced into the socket 13, the lower surface line of the projecting portion 12 carrying that socket is in the same line as the lower surface of the spoke 16 from the shoulder 18 outward. The metal composing the socket member 12 and the form of the spoke however, are so arranged that the upper surface of the socket member 12 from the line A—A to the line B—B will be at a slight angle to the upper surface of the spoke 16 from the line C—C to B—B, the point of the angle being at the line B—B. In other words, the socket and the adjacent portion of the wooden spoke contain excess material and are thicker at the line B—B and on both sides of it in varying degrees to the lines A—A and C—C.

After the spoke has been inserted in the socket as above indicated, a die extending from the line C—C to the line A—A is applied to the spoke and socket and heavy pressure is applied to the die by suitable means transversely of the line of the socket and spoke in substantially vertical direction on the parts, as shown in the drawing. This pressure is made sufficient to bend or move the upper and lower end portions of the socket relatively to each other inwardly partly closing the end of the socket and reducing its diameter and at the same time compressing the portion 15 of the wood spoke enclosed in it and that portion of the spoke between the lines B—B and C—C. This compression is carried far enough to bring the upper line from A to B into alignment with the line from B to C. In other words, the spoke and socket then have a symmetrical taper and the portion 15 of the spoke in the socket has a reversed wedgeshape and thus is keyed in the socket and cannot be pulled out longitudinally. The compression of the spoke beyond the end of the socket during the compression of the socket tends to prevent breaking the longitudinal fiber at the end of the socket by its inward movement and makes the fiber finer and closer. The curved portion 17 furthermore aids in preventing breaking the fiber and in producing a close joint between the shoulder 18 and the end of the socket.

Although a specific embodiment of the invention is shown for purposes of illustration, it will be understood that, it is not limited to the details shown beyond what is called for in the claims.

Having thus described the invention what is claimed as new and desired to be secured by Letters Patent is:

1. The method of securing wooden spokes to malleable metal hubs provided with one piece radiating sockets having open outer ends which consists in inserting in a socket the end of a wooden spoke which closely and tightly fits the interior surfaces of said socket and then applying pressure to opposite wall portions of said socket at its end sufficient to cause relative movement of said wall portions towards each other compressing the enclosed end of the wooden spoke and reducing the cross sectional size of the socket at its outer end portion.

2. The method of securing wooden spokes to malleable metal hubs provided with one piece radiating sockets having open outer ends which consists in inserting in a socket the end of a wooden spoke which closely and tightly fits the interior surfaces of said socket and then applying pressure to opposite wall portions of said socket at its end sufficient to cause relative movement of said wall portions towards each other compressing the enclosed end of the wooden spoke and reducing the cross section of the socket at its outer end portion to a size less than that of the inner end portion.

3. The method of securing wooden spokes to malleable metal hubs provided with one piece radiating sockets having open outer ends which consists in inserting in a socket the end of a wooden spoke which closely and tightly fits the interior surfaces of said socket and then applying pressure to opposite wall portions of said socket at its end sufficient to cause relative movement of said wall portions towards each other compressing the enclosed end of the wooden spoke and reducing the cross sectional size of the socket at its outer end portion, the opposite inner edges of the wall portions at the open end being on curves longitudinally.

4. The method of securing wooden spokes to malleable metal hubs provided with one piece radiating sockets having open outer ends and in which the bore is of substantially uniform cross section from a plane near the outer end to the inner end which consists in inserting in a socket the end of a wooden spoke which closely and tightly fits the interior surfaces of said socket and then so applying sufficient pressure to opposite wall portions of said socket from its outer end inwardly to its inner end as to cause relative movement of said wall portions towards each other reducing the cross sectional size of the socket a maximum amount at the outer end and a gradually decreasing amount inwardly to the bottom thus compressing and clamping the enclosed end of the spoke in inverted wedge shape longitudinally.

5. The method of securing wooden spokes to a malleable metal hub provided with one piece radiating sockets having open outer ends and in which the bore is of substantially uniform cross section from a plane near the outer end to the inner end but in which opposite inner surfaces at the open end are on longitudinal curves merging into the surface of the bore and into the surface of the end of the socket between the bore and outer margin, which consists in inserting the end of a wooden spoke in the socket tightly fitting it from end to end then applying squeezing pressure causing opposite walls of the socket to have relative movement towards each other greatest at the outer end compressing the wood of the enclosed end of the spoke and holding it by wedging action.

6. The method of securing wooden spokes having end portions of substantially uniform cross section of materially less size than the cross section of the next adjacent portion forming a shoulder, to a malleable metal hub provided with one piece radiating sockets having open outer ends and of such cross sectional interior size as to be adapted to tightly fit the end portion of a spoke and of substantially the same exterior cross sectional size at its open end as the portion of the spoke on the outer side of its shoulder, which consists in inserting the end of the spoke in the socket with its shoulder abutting the end of the socket and then applying lateral pressure to the socket and adjacent portions of the spoke compressing the spoke and reducing the cross sectional size of the socket the greatest reduction being at the outer end.

7. The method of securing a wooden spoke to a hub provided with a one piece malleable metal socket open at its outer end, the spoke having an end portion adapted to enter the open end of and tightly fit in said socket with a shoulder abutting the end of the socket, the outer surface of the spoke and socket on one side being in straight lines when said end portion is in the socket and the other side being at slight angles to each other meeting at the outer edge of the shoulder as the point of the angle, which consists in inserting the end portion of the spoke in the socket, supporting the straight line side of the socket and spoke and so applying pressure to the other side of the spoke and socket as to so compress the wood of the spoke and bend and relatively move the wall of the socket as to bring the outer longitudinal meeting surfaces of the spoke and socket on that side into straight continuous lines.

8. The method of securing a wooden spoke to a hub provided with a one piece malleable metal socket open at its outer end, the spoke having an end portion adapted to enter the open end of and tightly fit in said socket with a shoulder abutting the end of the socket, the outer surfaces of the spoke and socket on one side being on straight lines when said end portion is in the socket and on the other side being at slight angles to each other meeting at the outer edge of the shoulder as the point of the angle, which consists in inserting the end portion of the spoke in the socket, supporting the straight line side of the socket and spoke and so applying pressure to the other side of the spoke and socket as to so compress the wood of the spoke and bend and relatively move the wall of the socket as to bring the outer longitudinal meeting surfaces of the spoke and socket on that side into straight continuous lines, the inner edge of the end of the socket and the inner portion of the shoulder on the spoke being similarly curved longitudinally where the movement due to compression takes place.

9. A steering wheel comprising a metal hub with radiating sockets having open outer ends and a smaller interior cross sectional size at the end than at other portions inwardly thereof and spokes composed of wood having end portions tightly fitting in said sockets and compressed at the outer ends of said sockets.

10. A steering wheel comprising a metal hub with radiating sockets with open outer ends and bores tapering from the inner end to the outer end spokes composed of wood having end portions tightly fitting in said sockets with their outer surfaces beyond the sockets constituting straight line continuations of the outer surfaces of the sockets and the portions in the sockets near their outer ends being compressed.

11. A steering wheel comprising a metal hub with radiating sockets with open outer ends and bores tapering from the inner end to the outer end, spokes composed of wood having end portions tightly fitting in said sockets with their outer surfaces beyond the sockets constituting straight line continuations of the outer surfaces of the sockets and the portions in the sockets near their outer ends being compressed, and the adjacent portions beyond the sockets being compressed and thus having a close fiber.

In testimony whereof I hereunto affix my signature.

EDWARD J. LOBDELL, Jr.